United States Patent [19]

Uemura et al.

[11] Patent Number: 5,384,187
[45] Date of Patent: Jan. 24, 1995

[54] BIODEGRADABLE RESIN COMPOSITIONS AND LAMINATES BASED THEREON

[75] Inventors: Tomoyoshi Uemura, Ibaraki; Yoshimi Akamatsu, Amagasaki; Yuichi Yoshida, Kobe; Yoshikazu Moriwaki, Osaka, all of Japan

[73] Assignee: Nippon Gohsei Kagaku Kogyo Kabushiki Kaisha, Osaka, Japan

[21] Appl. No.: 961,707

[22] PCT Filed: May 15, 1992

[86] PCT No.: PCT/JP92/00633

§ 371 Date: Jan. 11, 1993

§ 102(e) Date: Jan. 11, 1993

[87] PCT Pub. No.: WO92/20739

PCT Pub. Date: Nov. 26, 1992

[30] Foreign Application Priority Data

| | | | |
|---|---|---|---|
| May 15, 1991 | [JP] | Japan | 3-140948 |
| Jul. 1, 1991 | [JP] | Japan | 3-188016 |
| Aug. 27, 1991 | [JP] | Japan | 3-242535 |
| Aug. 30, 1991 | [JP] | Japan | 3-280749 |
| Aug. 30, 1991 | [JP] | Japan | 3-280750 |

[51] Int. Cl.⁶ .......... B32B 27/06; B32B 27/18; C08L 3/00; C08L 29/04
[52] U.S. Cl. .......... 428/262; 428/461; 428/500; 428/507; 428/511; 428/514; 428/515; 428/516; 428/520; 524/47; 524/48; 525/56
[58] Field of Search .......... 428/515, 516, 511, 520, 428/500, 514, 507, 262, 290; 525/56, 58; 524/53, 47, 48

[56] References Cited

U.S. PATENT DOCUMENTS

| | | | |
|---|---|---|---|
| 5,091,262 | 2/1992 | Knott et al. | 428/516 |
| 5,108,807 | 4/1992 | Tucker | 428/35.2 |
| 5,158,810 | 10/1992 | Oishi et al. | 428/515 |
| 5,217,803 | 6/1993 | McBride et al. | 428/323 |
| 5,334,634 | 8/1994 | Bastioli et al. | 524/53 |

FOREIGN PATENT DOCUMENTS

| | | |
|---|---|---|
| 0400532 | 12/1990 | European Pat. Off. . |
| 0404723 | 12/1990 | European Pat. Off. . |
| 56-14544 | 2/1981 | Japan . |
| 3-31333 | 2/1991 | Japan . |
| 3-79645 | 4/1991 | Japan . |
| 3-217439 | 9/1991 | Japan . |

*Primary Examiner*—James J. Seidleck
*Assistant Examiner*—M. L. Warzel
*Attorney, Agent, or Firm*—Armstrong, Westerman, Hattori, McLeland & Naughton

[57] ABSTRACT

A biodegradable resin composition including a saponified ethylene-vinyl acetate copolymer and a starch-based macromolecular substance. The saponified ethylene-vinyl acetate copolymer is one having an ethylene content of 20 to 60 mole %, a vinyl acetate saponification degree of not less than 90 mole %, a melt flow index of 1 to 100 g/10 min as measured under a load of 2160 g at 210° C., and a melt viscosity ratio $\eta_{60}/\eta_5$ of 0.5 to 4 where $\eta_{60}$ means the melt viscosity after 60 minutes of standing at 250° C. and the $\eta_5$ means the melt viscosity after 5 minutes of standing at 250° C. and a starch-based macromolecular substance. A layer of the above composition can be used to fabricate a laminate with a substrate material of a different kind, such as a photodegradable polymer.

6 Claims, No Drawings

1

BIODEGRADABLE RESIN COMPOSITIONS AND LAMINATES BASED THEREON

TECHNICAL FIELD

The present invention relates to a biodegradable resin composition comprising a saponified ethylenevinyl acetate copolymer and a starch-based macromolecular substance and to a laminate utilizing the same.

BACKGROUND ART

Prior art

Molded plastic products such as plastic packaging films and containers, agricultural plastic films, binding tapes and so on are sometimes disposed of in ways other than legitimate routes of disposal. Because these products retain their shapes for years, they present serious environmental problems when discarded as they are. Therefore, it is highly desirable that any shaped products that are liable to be discarded in the open field, farmlands, rivers, etc. be those which will be rapidly decomposed by microorganisms in the soil or water.

Against this background, much development work has been undertaken to develop biodegradable compositions for the fabrication of such biodegradable shaped products. Referring to research and development along this line, the following patent applications have been filed in the technical field of bio-degradable or disintegratable compositions each comprising a saponified ethylene-vinyl acetate copolymer (i.e. ethylenevinyl alcohol copolymer) and a starch-based macromolecular substance.

Japanese Patent Kokai Publication No. 3-31333

The official gazette of Japanese Patent Kokai Publication No. 3-31333 discloses a polymer composition for the manufacture of shaped biodegradable plastic products which comprises an ethylene-vinyl alcohol copolymer and a modified starch wherein the ethylene content of said ethylene-vinyl alcohol copolymer is 10 to 90 weight % and the melt flow index thereof is 2 to 50. The melt flow index here is the value determined at 230° C. under a load of 2.16 kg. The same gazette states that the preferred parameters of the ethylenevinyl acetate copolymer are as follows.

Intrinsic viscosity [$\eta$] (in dimethyl sulfoxide, 30° C.): 0.5–0.9, preferably 0.60–0.80
Molecular weight distribution Mw/Mn (GPC in tetrahydrofuran): 1.3–4
Melting point: <180° C., preferably 160°–170° C.
Degree of hydrolysis: 90–99.9%

The same gazette states that, as the plasticizer, a polyol such as polyethylene glycol having a molecular weight of 200 to 4000, ethylene glycol, propylene glycol, sorbitol, or preferably glycerin can be employed.

Japanese Patent Kokai Publication No. 2-14228

The official gazette of Japanese Patent Kokai Publication No. 2-14228 discloses a polymer blend obtainable from a melt comprising a water-containing starch hydrolyzate and at least one substantially water-insoluble synthetic thermoplastic polymer. Claim 4 in the Scope of Demand for Patent of this gazette is directed to the use, as the thermoplastic polymer, of ethylene-vinyl acetate copolymer, ethylene-vinyl alcohol copolymer, ethylene-acrylic acid copolymer, ethylene-ethyl acrylate copolymer, ethylene-methyl acrylate copolymer, ABS copolymer, styrene-acrylonitrile copolymer or polyacetal, thus referring to ethylene-vinyl alcohol copolymer, but there is no description about its ethylene content, nor does the specification include an example employing an ethylene-vinyl alcohol copolymer.

This gazette mentions, as the plasticizer, a variety of plasticizers such as low molecular weight polyalkylene oxides, e.g. polyethylene glycol, polypropylene glycol, polyethylenepropylene glycol, etc., low molecular weight organic plasticizers such as glycerol, glycerol monoacetate, diacetate or triacetate, etc., as well as propylene glycol, sorbitol, sodium diethylsulfosuccinate, triethyl citrate, tributyl citrate and so on.

Japanese Patent Kokai Publication No. 3-24101

The official gazette of Japanese Patent Kokai Publication No. 3-24101 discloses a method of producing a modified starch composition for the manufacture of shaped biodegradable plastic products which comprises blending starch with a high boiling plasticizer and a modifying agent selected from among urea, alkaline earth or alkali metal hydroxides and mixtures thereof at a temperature of 120° to 170° C. which is lower than the boiling point of the plasticizer for a sufficient time to modify the starch. Claim 5 in the Scope of Demand for Patent of this gazette states that the blending is performed in the presence of up to 15 weight % of the total weight of the mixture of an ethylene-acrylic acid copolymer and/or a polyvinyl alcohol. Furthermore, immediately preceding the Examples, the same gazette states that this modified starch composition is suited for blending with an ethylene-vinyl alcohol copolymer and an example is given as Example 5 in which a composition comprising 60 weight % of modified starch in the pellet form and 40 weight % of an ethylene-vinyl alcohol copolymer (Kuralene R20 (trademark)) is extruded. However, there is no specific reference to the ethylene content.

This gazette mentions, as the preferred plasticizer, such species as glycerin, polyethylene glycol, preferably polyethylene glycol having a molecular weight of 200 to 4000, ethylene glycol, propylene glycol, sorbitol and so on.

Problems that the Invention is to Solve

Any biodegradable/disintegratable composition comprising an ethylene-vinyl alcohol copolymer and a starch-based macromolecular substance contains a large amount of the starch-based macromolecular substance which is liable to undergo pyrolysis in melt-molding and the ethylene-vinyl alcohol copolymer contained is also one of the resins comparatively difficult to melt-mold among the ordinary thermoplastic resins. Therefore, in this binary system, molding troubles such as deposits of burned resin around the die, gelation, coloration on aging, fish eye, etc. tend to take place in long-run production. In order to supply a biodegradable/-disintegratable product at low cost and on a steady basis in such a binary system, these problems associated with long-run moldability must be overcome.

However, in the gazette of Japanese Patent Kokai Publication No. 3-31333 referred to above, the ethylene-vinyl alcohol copolymer is selected only with reference to the commonplace indicators such as ethylene content, degree of saponification, melt flow index, intrinsic viscosity (an indicator of molecular weight), melting point and molecular weight distribution and, in regard to the melt characteristics of resin, attention is paid only to the parameters of melting point and melt flow index. Check experiments of the Examples described in Japanese Patent Kokai Publication No. 3-31333 indicate that although early moldability is acceptable on the whole, a variety of defects develop in moldings on long-run molding. This is probably because they did not have a definite idea about the melt characteristics necessary for long-run molding.

The official gazette of Japanese Patent Kokai Publication No. 2-14228 shows no specific example in which an ethylene-vinyl alcohol copolymer might have been actually used and, of course, the long-run moldability with this copolymer is not discussed.

Example 5 in the official gazette of Japanese Patent Kokai Publication No. 3-24101 indicates an example in which a composition comprising 60 weight % of pelletized modified starch and 40 weight % of an ethylene-vinyl alcohol copolymer was extruded using an extruder but there is no discussion on the melt characteristics of the copolymer, nor is the subject of long-run moldability explored, irrespective of the use of the copolymer.

After all, the above official gazettes of Japanese Patent Kokai Publication Nos. 3-31333, 2-14228 and 3-24101 show a mere background technology concerning the biodegradable/disintegratable composition comprising a saponified ethylene-vinyl acetate copolymer (ethylene-vinyl alcohol copolymer) and a starch-based macromolecular substance and the long-run moldability of such a binary system remains to be elucidated yet.

Moreover, as mentioned above, any starch-based macromolecular substance is thermolabile and, when it is blended with a resin and subjected to melt-forming, undergoes pyrolysis at temperatures above about 180° C. On the other hand, the saponified ethylene-vinyl acetate copolymer is one of the thermoplastic resins which are difficult to melt-form. For example, the melting point of a highly saponified ethylene-vinyl acetate copolymer is not less than 180° C. when its ethylene content is about 30 mole % or less. Therefore, a binary system comprising these two materials tends to cause molding troubles or defects in shaped products. Therefore, in commercial production, it is essential to incorporate a variety of plasticizers mentioned above prior to molding. However, the application of those plasticizers which are commonly used in the conventional processes to the binary system comprising a saponified ethylene-vinyl acetate copolymer and a starch-based macromolecular substance results in the problem of poor compatibility, inadequacy in the clarity and flexibility of the film or sheet formed therefrom, and changes in physical properties and contamination owing to bleeding of the plasticizer. Thus, improvements that would satisfy all of these requirements have been much awaited.

It is an object of the present invention to provide a resin composition capable of providing a biodegradable or biodisintegratable shaped product.

It is a further object of the invention to improve the melt-moldability, particularly long-run moldability, of a binary system comprising a saponified ethylene-vinyl acetate copolymer and a starch-based macromolecular substance.

A further object of the invention is to provide a resin composition which, when molded into film or sheet with the aid of a plasticizer, insures satisfactory clarity and flexibility and is less liable to undergo changes in physical properties or fouling due to bleeding of the plasticizer.

A still further object of the invention is to provide said composition conducive to a reduced amount of the plasticizer required.

It is a further object of the invention to provide a laminate comprising a layer composed of said composition and a backing layer (particularly a substrate film composed of a photodegradable polymer).

DISCLOSURE OF INVENTION

The biodegradable resin composition of the present invention comprises a saponified ethylene-vinyl acetate copolymer having an ethylene content of 20 to 60 mole a vinyl acetate saponification degree of not less than 90 mole %, a melt flow index of 1–100 g/10 min. as measured under a load of 2160 g at 210° C. and a melt viscosity ratio $\eta_{60}/\eta_5$, between the melt viscosity $\eta_{60}$ after 60 minutes at 250° C. and the melt viscosity $\eta_5$ after 5 minutes at 250° C., of 0.5–4 and a starch-based macromolecular substance.

The laminate of the present invention is a laminar structure comprising a layer comprosed of said biodegradable resin composition and a layer composed of a different material (particularly at least one photodegradable polymer selected from the group consisting of ethylene-CO copolymer, ethylene-vinyl ketone copolymer, polybutadiene and isoprene rubber or a polyolefin type photodegradable polymer containing at least one of said polymers).

The present invention is now described in detail.

Saponified ethylene-vinyl acetate copolymer

As the saponified ethylene-vinyl acetate copolymer, a copolymer having an ethylene content of 20–60 mole %, preferably 25–50 mole %, and a vinyl acetate saponification degree of not less than 90 mole %, preferably not less than 95 mole % is employed. If the ethylene content is less than 20 mole %, the melt-moldability of the composition is sacrificed. If 60 mole % is exceeded, the mechanical strength and gas barrier property of the product are impaired so that the practical utility of the composition is compromised. If the vinyl acetate saponification degree is less than 90 mole %, the mechanical strength will not be sufficient. Moreover, outside of the above-mentioned range, not only the physical characteristics of the product but also the compatibility of the polymer with the starch-based macromolecular substance is adversely affected.

As the saponified ethylene-vinyl acetate copolymer, two or more species varying in ethylene content can be employed in combination. An example is the use, in combination, of a saponified ethylene-vinyl acetate copolymer having an ethylene content of 40–60 mole % and a saponified ethylene-vinyl acetate copolymer having an ethylene content of 20–50 mole %, the ethylene content of the former being greater than that of the latter by at least 5 mole %, in a weight ratio of 70:30 through 30:70.

Within the limits not jeopardizing the object of the invention, the saponified ethylene-vinyl acetate copolymer of the above composition may have been modified by copolymerization with other copolymerizable monomers [other α-olefins, ethylenically unsaturated carboxylic acid compounds (acids, anhydrides, salts, esters, amides, nitriles, etc.), vinyl ethers, vinyl esters other than vinyl acetate, ethylenically unsaturated sulfonic acid compounds (acids, salts, etc.), oxyalkylene-containing monomers and so on] or "postmodified" by oxyalkylene-etherization, cyanoethylation, acetalization, urethanation, etc.

Regarding the melt-characteristics of the saponified ethylene-vinyl acetate copolymer having the above composition, it is first of all necessary that the copolymer should have a melt flow index of 1 to 100 g/10 min, preferably 1 to 60 g/min, and more preferably 2 to 30 g/10 min, as measured under a load of 2160 g at 210° C. If the melt flow index is outside of the above range, the polymer will be unqualified as a melt-molding grade.

Another essential melt-characteristic for the saponified ethylene-vinyl acetate copolymer for use in accordance with the invention is that the melt viscosity ratio $\eta_{60}/\eta_5$, i.e. the ratio of the melt viscosity $\eta_{60}$ after 60 minutes at 250° C. to the melt viscosity $\eta_5$ after 5 minutes at 250° C., should be 0.5 to 4 and preferably 0.8 to 2.5. This is an essential element of the present invention. If $\eta_{60}/\eta_5$ is less than 0.5, that is to say the tendency to viscosity decrease exceeds the allowable range, long-run molding results in the deposition of burned resin around the die, infiltration of gels, formation of fish eyes, coloration on aging and other product defects as well as molding instability in the manufacture of a strand or film. If $\eta_{60}/\eta_5$ exceeds 4, that is to say the tendency toward viscosity gain exceeds the allowable range, long-run molding results in the deposition of burned resin around the die, infiltration of gels, formation of fish eyes and other product defects. Thus, in either case, the long-run molding operation is made difficult.

The melt viscosity mentioned above is the value determined with a Koka type flow tester using a 1 mm $\phi \times 10$ mm nozzle and a load of 10 kg/cm$^2$. The values $\eta_5$, $\eta_{60}$ are found by measuring the viscosities at the residence times in the cyclinder of 5 and 60 minutes at a temperature of 250° C.

Such saponified ethylene-vinyl acetate copolymer varies its properties according to the polymerization method, saponification method, degree of polymerization, degree of saponification, treatment following saponification, drying conditions, additives, etc. and the method of production cannot be defined in general terms. Typically, however, it can be obtained by saponifying an ethylene-vinyl acetate copolymer having the above-defined ethylene content with alkali and purifying the resulting saponified ethylene-vinyl acetate copolymer powder, grains or pellets by washing. In this purification by washing, the resin is thoroughly washed with an aqueous solution of acid, especially of a weak acid, or a dilute aqueous solution of a strong acid or an acidic salt thereof and, if necessary, further rinsed to remove the acid attached to the resin, followed by drying.

The weak acid which can be used as above generally includes acids having pKa (25° C.) values of not less than 3.5, such as acetic acid, propionic acid, glycolic acid, lactic acid, adipic acid, azelaic acid, glutaric acid, succinic acid, benzoic acid, isophthalic acid, terephthalic acid and so on. It is possible and preferable to further treat the resin with a dilute strong acid, e.g. an aqueous solution of an organic acid having a pKa (25° C.) value of not more than 2.5, such as oxalic acid, maleic acid, etc., an inorganic acid such as phosphoric acid, sulfuric acid, nitric acid, hydrochloric acid, etc. or an acidic salt thereof before or after aqeuous rinse following said treatment with a weak acid.

When the $\eta_{60}/\eta_5$ values of commercial saponified ethylene-vinyl acetate copolymers are investigated from the above standpoint of melt characteristics, they are found to vary a great deal from one showing a tendency toward viscosity gain to one showing a tendency toward viscosity drop, indicating that no attention has heretofore been paid to $\eta_{60}/\eta_5$.

The saponified ethylene-vinyl acetate copolymer can also be obtained as one having a water content of 20 to 60 weight % according to conditions of production. The compatibility of such a copolymer with the starch-based macromolecular substance is superior and can be smoothly melt-molded even without use of a plasticizer or with a reduced amount of the plasticizer. However, an excessive water content should be avoided, for otherwise foaming may take place in melt-molding to interfere with smooth molding or the surface characteristics of moldings will be adversely affected. Typically such a saponified ethylene-vinyl acetate copolymer can be prepared by adding water to a methanolic solution of the saponified ethylene-vinyl acetate copolymer obtained by alkali saponification of an ethylene-vinyl acetate. copolymer to give a solution in the mixed solvent of water-methanol, introducing this solution into water for coagulation, pelletizing or crushing the coagulate, and purifying the same by washing. In the purification by washing, it is preferable, just as described before, to wash the resin thoroughly with acid, particularly an aqueous solution of a weak acid or a dilute aqueous solution of an acidic salt of a strong acid, removing the acid attached to the resin by rinsing, and drying the resin under conditions conducive to the desired water content.

Starch-based macromolecular substance

The starch-based macromolecular substance includes raw starches such as corn starch, potato starch, sweet potato starch, wheat starch, cassava starch, sago starch, tapioca starch, sorghum starch, rice starch, legume starch, arrowroot starch, bracken starch, Indian lotus starch, water chestnut starch, etc.; physically modified starch (a-starch, fractionated amylose, wet heat-treated starch, etc.), enzymatically modified starch (hydrolyzed dextrin, enzymatically degraded dextrin, amylose, etc.); chemically degraded and modified starch (acid-treated starch, hypochlorite-oxidized starch, dialdehyde starch, etc.); chemically modified starch derivatives (esterified starch, etherized starch, cationized starch, crosslinked starch, etc.) and so on. Among said chemically modified starch derivatives, esterified starch includes acetic acid-esterified starch, succinic acid-esterified starch, nitric acid-esterified starch, phosphoric acid-esterified starch, urea phosphoric acid-esterified starch, xanthic acid-esterified starch, acetoacetic acid-esterified starch, etc. The etherized starch includes allyl-etherized starch, methyl-etherized starch, carboxymethyl-etherized starch, hydroxyethyl-etherized starch, hydroxypropyl-etherized starch, etc. The cationized starch includes the reaction product between starch and 2-diethylaminoethyl chloride and the reaction product between starch and 2,3-epoxypropyltrimetylammonium chloride, etc. The crosslinked starch includes formaldehyde-crosslinked starch, epichlorohydrin-crosslinked starch, phosphoric acid-crosslinked starch, acrolein-crosslinked starch and so on.

In the practice of the present invention the starch-based macromolecular substance can be used in hydrated state and the proper water content in that case may for example be 8 to 30 weight %. Then, coloration, burning, charring and contamination with foreign matter may be alleviated.

Proportions

The ratio of saponified ethylene-vinyl acetate copolymer to starch-based macromolecular substance is preferably 80:20 through 20:80, w/w, and more preferably 70:30 through 30:70, w/w. If the proportion of starch-based macromolecular substance is too small, the biodegradability and disintegratability will be poor, while an excessive proportion of the substance detracts from the mechanical properties of moldings. However, depending on applications, some derivation from the above ratio can be tolerated.

Additives

While the resin composition of the present invention is essentially composed of said saponified ethylene-vinyl acetate copolymer and starch-based macromolecular substance, it may contain as necessary a variety of additives such as plasticizers (e.g. polyhydric alcohols, urea, etc.), resin components (e.g. ethylene copolymers and other polyolefins, hydrogenated styrene-butadiene rubber, polyurethane, polyamide, polyhydroxybutyrate, etc.), natural polymers other than those related to starch (polysaccharide type polymers, cellulosic polymers, proteinaceous polymers, etc.), heat stabilizers, diluents, autoxidants, fillers, lubricants, colorants, flame retardants, waterproofing agents, ultraviolet absorbers, crosslinking agents, fungicides, herbicides, antioxidants and so on. As starch modifiers, urea, alkaline earth or alkali metal hydroxides or mixtures thereof can also be added.

It is particularly instrumental to incorporate a polyhydric alcohol, such as glycerin, trimethyolpropane, pentaerythritol, ethylene glycol, diethylene glycol, triethylene glycol, propylene glycol, dipropylene glycol, polypropylene glycol, etc. as well as urea. The amount of such plasticizer can be optionally selected.

In the practice of the invention, the polyhydric alcohol preferably has 2 to 4 hydroxyl groups and melts at a temperature not below 40° C., preferably between 40° and 150° C., and has a molecular weight of not more than 600, preferably between 100 and 300. Among examples of such polyhydric alcohol are dihydric alcohols such as 1,6-hexanediol, 1,8-octanediol, 1,9-nonanediol, 1,10-decanediol, neopentyl glycol, hydrobenzoin, 1,2-cyclohexanedimethanol, etc.; trihydric alcohols such as trimethylolpropane, trimethylolethane, etc.; and tetrahydric alcohols such as pentaerythritol. Among them, 1,6-hexanediol, neopentyl glycol, 1,4-cyclohexanedimethanol, and trimethylolpropane are preferred from practical points of view. The proportion of such polyhydric alcohol is 5 to 50 parts by weight, preferably 10 to 40 parts by weight, based on 100 parts by weight of the sum of said saponified ethylene-vinyl acetate copolymer and starch-based macromolecular substance. If the proportion is less than 5 parts by weight, the effect will not be sufficient, while a proportion of more than 50 parts by weight will not insure a commensurate effect but rather detract from mechanical strength to make the composition unpractical.

Melt-molding technology

As the melt-molding technology, extrusion molding (inclusive of blow molding) can be mainly utilized. However, calendering and injection molding processes can also be employed. The preferred extrusion molding process comprises feeding the saponified ethylene-vinyl acetate copolymer and the starch-based macromolecular substance either independently or concurrently to an extruder for melt-mixing and pelletization and feeding the resulting pellets to an extruder for molding to the desired shape. The melt-forming temperature in the latter stage is often set to a temperature not exceeding 180° C. When the starch-based macromolecular substance or the saponified ethylene-vinyl acetate copolymer is hydrous or when the molding operation is performed with addition of water, it is preferable to reduce the water content of the extrudate to 5 weight % or less using an extruder equipped with a vent means before feeding to the latter stage extruder for melt-molding.

When the melt-molding is carried out by extrusion molding, it is generally preferable to set the resin temperature at the joint between the extruder and the die to 170° C. or below and the shear rate of the melt passing through the die lip to not less than 100 sec$^{-1}$.

In molding, it is also possible to employ a special mixing mode such that the saponified ethylenevinyl acetate copolymer and the starch-based macromolecular substance are independently melted beforehand and, then, blended in molten state. According to this mode, there can be manufactured a shaped product of improved quality with reduced incidences of discoloration associated with thermal degradation, fish eyes, grains, gelation and burn. In this case, a plasticizer may be incorporated but its proportion need not be greater than, for example, 10 parts by weight relative to 100 parts by weight of the sum of saponified ethylene-vinyl acetate copolymer and starch-based macromolecular substance. Regarding the above mode in which the saponified ethylene-vinyl acetate copolymer melted by heating beforehand is blended with the starch-based macromolecular substance similarly melted beforehand, an exemplary process comprises melting the starch-based macromolecular substance in a twin-screw extruder in the first place and feeding the saponified ethylenevinyl acetate copolymer from a side feed port of the same twin-screw extruder for mixing to give a homogeneous blend. For the manufacture of shaped products, it is preferable to pelletize the blend thus obtained and feed the pellets to an extruder for molding to the desired shape.

Laminate

In accordance with the present invention, a layer composed of such a composition comprising the saponified ethylene-vinyl acetate copolymer and starch-based macromolecular substance can be laminated with a layer composed of a different substrate material. The different material mentioned just above may for example be a thermoplastic resin, kraft or other paper, woven cloth, nonwoven cloth, metal foil or wood board.

The thermoplastic resin includes, among others, polyolefin resin, vinyl alcohol resin, acrylic resin, polyamide resin, polyester resin, polyurethane resin, polystyrene resin, polyacetal resin, polycarbonate resin, diene type resin, cellulosic resin and so on. When, among these thermoplastic resins, particularly one or more photodegradable polymers selected from the group consisting of ethylene-CO copolymer, ethylenevinyl ketone copolymer, polybutadine and isoprene rubber or a polyolefinic photodegradable polymer containing at least one of these resins as blended, or even a photodegradable polymer rendered photodegradable by incorporation of a transition metal or a photosensitizer is employed as said different material for lamination with the layer comprised of the composition of the invention which is per se biodegradable, the resulting laminate as a whole is naturally disintegratable. The laminate obtainable by using a paper, a natural cellulose-based woven or nonwoven cloth, a wooden board or the like is also biodegradable and disintegratable. Therefore, an increased industrial usefulness can then be attained.

The ethylene-CO copolymer can be obtained by copolymerizing ethylene with CO at high temperature and super-high pressure and the copolymerizing rate of CO is generally about 0.3 to 10 weight %. The ethylenevinyl ketone copolymer includes ethylenemethyl vinyl ketone copolymer and ethylene-phenyl vinyl ketone copolymer, to name but a few. The copolymerizing proportion of vinyl ketone is generally about 0.1 to 10 mole % but may be higher. The polybutadiene includes thermoplastic 1,2-polybutadiene, high cis-butadine and low cis-butadiene rubbers, to name but a few. Particularly preferred is a thermoplastic 1,2-polybutadiene with 90% of butadiene units forming 1,2-bonds. The isoprene rubber includes natural rubber, isoprene rubber, trans-polyisoprene, etc. and, among them, natural rubber is particularly important.

It is also possible to employ a photodegradable polymer prepared by blending 3 to 20 parts by weight of any of said ethylene-CO copolymer, ethylene-methyl vinyl ketone copolymer, ethylene-phenyl vinyl ketone copolymer, 1,2-polybutadiene, etc. with 100 parts by weight of a polyolefin such as a low-density polyethylene, linear low-density polyethylene, high-density polyethylene, polypropylene, ethylene-vinyl acetate polymer or the like. It is also possible to employ a photodegradable polymer whose photodegradability has been imparted by a transition metal salt or a photosensitizer.

As the transition metal salt, these can be employed salts of stearine, dialkylthiocarbamates, salicylaldehyde, acetylacetone benzophenone oxime, etc. with iron(II), zinc(II), manganese(II), nickel(II), cerium(III), cobalt-(II) or the like. The photosensitizer may for example be benzophenone, acetophenone or anthraquinone.

For laminating a layer comprised of the above composition with a layer comprised of said different material, any of the known methods such as dry lamination, extrusion, co-injection, multi-layer inflation, multi-layer T-die extrusion, multi-layer blow molding, multi-layer pipe extrusion, etc. can be invariably employed. As to the bonding mode of molten resin, whichever of "in-die" bonding and "out-of-die" bonding can be employed.

In manufacturing such a laminate by melt-molding, an adhesive can be employed with advantage. For the adhesive layer, a variety of adhesives such as polyolefin, polyester, acrylic and other adhesives can be successfully utilized. Preferably, acid-modified polyolefins, and more preferably carboxylic acid (e.g. maleic anhydride)-modified polypropylene, carboxylic acid-modified ethylene-vinyl acetate copolymer adhesives are employed. Such an adhesive layer is generally used in a thickness of 5 to 50 μm. As the anchor coating agent for dry lamination, isocyanate, polyethyleneimine, polybutadiene, organotitanium and other coating agents can be advantageously employed and the coating thickness is generally 0.5 to 2 μm.

Other

The photodegradable polymer mentioned hereinbefore may be incorporated in a composition comprising said saponified ethylene-vinyl acetate copolymer and starch-based macromolecular substance. The proportion of the photodegradable polymer for this purpose is generally 3 to 70 parts by weight based on 100 parts by weight of the sum of saponified ethylene-vinyl acetate copolymer and starch-based macromolecular substance.

Operation and Result

The present invention employs a saponified ethylene-vinyl acetate copolymer having a definite melt characteristic, that is to say one having the specified melt viscosity ratio $\eta_{60}/\eta_5$, where $\eta_{60}$ means the melt viscosity after 60 minutes of standing at 250° C. and $\eta_5$ means the melt viscosity after 5 minutes of standing at 250° C., so that despite it being a binary system comprising a saponified ethylene-vinyl acetate copolymer and a starch-based macromolecular substance, the acceptable melt moldability and particularly long-run moldability which are the long-standing problems to be solved are remarkably improved. Therefore, the invention permits a stable supply of biodegradable shaped products in this binary system.

Furthermore, when a polyhydric alcohol containing 2 to 4 hydroxyl groups within the molecule and having a melting point of not lower than 40° C. and a molecular weight of not more than 600 is employed as the plasticizer, molding compatibility is very satisfactory and films of excellent clarity and flexibility can be manufactured. Moreover, bleeding of the plasticizer can also be avoided.

When a hydrous saponified ethylene-vinyl acetate copolymer with a water content of 20 to 60 weight % is employed as said saponified ethylene-vinyl acetate copolymer, satisfactory moldability is assured even if addition of the plasticizer is omitted or the amount of the plasticizer is drastically reduced.

Furthermore, when the saponified ethylene-vinyl acetate copolymer and the starch-based macromolecular substance are independently melted beforehand and blended in molten state, satisfactory melt-molding results can be obtained even with a reduced amount of the plasticizer.

Laminating a layer composed of the above composition with a substrate layer (particularly a layer composed of at least one photodegradable polymer selected from the group consisting of ethylene-CO copolymer, ethylene vinyl ketone copolymer, polybutadiene and isoprene rubber or a polyolefin-based photodegradable polymer blend containing at least one of said polymers) is useful in that it broadens the scope of applicability.

BEST MODE FOR CARRYING OUT THE INVENTION

The following examples are intended to describe the invention in further detail.

Examples 1~5, Comparative Examples 1~5

Production of saponified ethylene-vinyl acetate copolymers

To a methanolic solution of an ethylene-vinyl acetate copolymer having an ethylene content of 44 mole 38 mole %, 32 mole % or 29 mole % was added sodium hydroxide, as the catalyst, for primary saponification and the resulting preliminary hydrolysate was dispersed in water. Then, a further amount of sodium hydroxide was added for secondary saponification to obtain a saponified ethylene-vinyl acetate copolymer having a saponification degree of 99 mole %. This hydrolysate was rinsed with water and, where necessary, washed with a dilute aqueous solution of acetic acid or sodium phosphate, followed by drying. In this manner, saponified ethylene-vinyl acetate copolymers having the characteristic values indicated hereinafter in Table 1 were obtained.

Melt-molding and evaluation of long-run moldability

Each of the saponified ethylene-vinyl acetate copolymers obtained above was fed to a twin-screw extruder via its main feeder at a rate of 3 kg/hr. At the same time, a mixture of 100 parts by weight of starch (corn starch) and 30 parts by weight of glycerin was fed to the above twin-screw extruder via its side feeder at a rate of 4 kg/hr. The strand extruded through the die was pelletized with a pelletizer to give pellets 3 mm in diameter and 3 mm in length. The temperature settings of the twin-screw extruder were as follows.

| $C_1$ | $C_2$ | $C_3$ | $C_4$ | $C_5$ | H | D |
|---|---|---|---|---|---|---|
| 200° C. | 170° C. | 160° C. | 160° C. | 160° C. | 160° C. | 160° C. |

This pelletizing operation was continued for 3 consecutive days (1 or 2 days in Comparative Examples) and the incidences of deposition of burned resin near the discharge port of the twin-screw extruder, infiltration of gels into the pellet, and the degree of pellet discoloration were investigated. After completion of the above continuous molding, the twin-screw extruder was disassembled and inspected for residues of degradation products.

Then, the above pellets (those obtained up to 3 hours after the beginning of pelletization) were fed to a single-screw extruder for repelletizing and this cycle was repeated for a total of 6 times. The final pellets were fed to a single-screw extruder equipped with a T-die to give a 30 μm thick film and the infiltration of gels into the film and the incidence of fish eye were investigated. Moreover, the extruder used for the production of film was disassembled and inspected for internal residues of degradation products.

In the above procedure, the single-screw extruder for pelletization and the single-screw extruder for film formation were set to the following temperatures.

| $C_1$ | $C_2$ | $C_3$ | $C_4$ | $C_5$ | H | D |
|---|---|---|---|---|---|---|
| 130° C. | 160° C. | 160° C. | 160° C. | 160° C. | 160° C. | 160° C. |

Single-screw extruder for film formation

| $C_1$ | $C_2$ | $C_3$ | $C_4$ | $C_5$ | H | D |
|---|---|---|---|---|---|---|
| 130° C. | 160° C. | 160° C. | 160° C. | 160° C. | 160° C. | 160° C. |

Results

The results of evaluation of long-run molding performance are shown below in Table 1. The characteristic values of the saponified ethylene-vinyl acetate copolymers used are also presented in Table 1.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Characteristic values of EVOH | | | | | | | | | | |
| Et content (mole %) | 44 | 44 | 38 | 32 | 29 | 44 | 38 | 38 | 32 | 29 |
| SV (mole %) | 99 | 99 | 99 | 99 | 99 | 99 | 99 | 99 | 99 | 99 |
| MFI (g/10 min) | 12 | 12 | 25 | 3 | 8 | 12 | 8 | 25 | 3 | 8 |
| $\eta_{60}/\eta_5$ | 1.2 | 0.9 | 2.2 | 2.5 | 2.0 | 4.9 | 5.5 | 0.1 | 5.2 | 0.3 |
| Long-run moldability with a twin-screw extruder | | | | | | | | | | |
| Number of days of continuous molding | 3 | 3 | 3 | 3 | 3 | 1 | 1 | 2 | 1 | 2 |
| Burnt resin deposits | None | None | None | Slight | None | Abundant | Abundant | Abundant | Abundant | Abundant |
| Gels | None | None | None | None | None | Abundant | Abundant | Obvious | Abundant | Obvious |
| Coloration on aging | None | Minimal | None | None | None | Minimal | Minimal | Obvious | None | Obvious |
| Degradation product residues | None | None | None | Minimal | None | Abundant | Abundant | Abundant | Abundant | Obvious |
| (Disassembling inspection) Overall evaluation | o | o | o | o | o | x | x | x | x | Δ |
| Film formation after 6 pelletizing cycles | | | | | | | | | | |
| Gels | None | None | None | None | None | Abundant | Abundant | Abundant | Abundant | Obvious |
| Fish eyes | None | None | None | None | None | Abundant | Abundant | Abundant | Abundant | Abundant |
| Degradation product residues | None | None | None | Minimal | None | Abundant | Abundant | Abundant | Abundant | Abundant |
| (Disassembling inspection) overall evaluation | o | o | o | o | o | x | x | x | x | x |

(Note)
The symbols used in Table 1 have the following meanings.
EVOH: saponified ethylene-vinyl acetate copolymer
Et content: ethylene content
Sv: saponification degree
MFI: melt flow index
$\eta_{60}/\eta_5$: melt viscosity ratio
(Note)
In Table 1, the degrees of burnt resin deposit, gel infiltration, coloration on aging and fish eye were respectively evaluated on the 5-grade scale of none, minimal, slight, obvious and abundant.

The overall evaluation was made on the 3-grade scale of o (good), Δ (fair) and x (poor).

Examples 6~10

Production of saponified ethylene-vinyl acetate copolymers

Each of ethylene-vinyl acetate copolymers varying in ethylene content was saponified, rinsed, washed with a dilute solution of acetic acid and a dilute aqueous solution of phosphoric acid, further rinsed and dried in the conventional manner.

The compositions, melt flow indices (MFI) and melt viscosity ratios of the resulting saponified ethylenevinyl acetate copolymers are shown below in Table 2.

Compound pelletization

A Henschel mixer was charged with pellets of a saponified ethylene-vinyl acetate copolymer obtained above, raw starch (corn starch with a water content of 12 weight %, an example of the starch-based macromolecular substance), and a plasticizer in the proportions and combination shown in Table 2. After mixing, the mixture was fed to a twin-screw extruder equipped with vent means and melt-extruded into a strand and, at the same time, pelletized with a pelletizer to give a pelleted resin composition. The temperature settings of the twin-screw extruder were as shown below.

| Screw diameter | 30 mm |
| --- | --- |
| L/D | 30 |
| Screw RPM | 150 rpm (unidirectional rotation) |
| Vent | Open vent |
| Die | Two nozzles, 5 mm in diameter |

| Temperature settings | | | | | | |
| --- | --- | --- | --- | --- | --- | --- |
| $C_1$ | $C_2$ | $C_3$ | $C_4$ | $C_5$ | H | D |
| 100° C. | 140° C. | 160° C. | 160° C. | 160° C. | 160° C. | 160° C. |

The resulting pellets were hot-pressed under the conditions of 150° C.×50 kgf/cm²×5 minutes to mold a mm-thick plate. To evaluate the clarity of the plate, the total light transmittance of the hot-pressed plate was measured in accordance with JIS K7105.

Film production

The above compound pellets were fed to a single-screw extruder equipped with a T-die to mold a 50 μm-thick film. The film-forming conditions of the single-screw extruder were as follows.

| Screw diameter | 40 mm |
| --- | --- |
| L/D | 28 |
| Screw RPM | 50 rpm (unidirectional rotation) |
| Screw configuration | Full flight |
| Compression ratio | 3.0 |
| T-die | Coat hanger type |
| Die width | 450 mm |
| Die lip opening | 0.5 mm |

| Temperature conditions | | | | | |
| --- | --- | --- | --- | --- | --- |
| $C_1$ | $C_2$ | $C_3$ | $C_4$ | H | D |
| 140° C. | 160° C. | 160° C. | 160° C. | 160° C. | 160° C. |

Bleeding test

The above film was sandwiched between strips of filter paper and allowed to stand at 20° C. and 65% RH. The staining of the filter paper due to bleeding of the plasticizer was investigated by washing the filter paper after standing with methyl alcohol and measuring the infrared absorption spectrum of a concentrate of the washing.

Biodegradability

The above film was cut to B5 size (25.8 mm×18.2 mm) and buried in a compost-soil mixture. After 6 months, the film was taken out and visually inspected and evaluated according to the following criteria.
a: Only residual fragments can be confirmed and no shape of the original film is retained.
b: The original shape is retained but a multiplicity of cracks and openings are observed all over.

Results

The results as well as the formulations are shown in Table 2.

TABLE 2

| | Example | | | | |
| --- | --- | --- | --- | --- | --- |
| | 6 | 7 | 8 | 9 | 10 |
| Characteristic values of EVOH | | | | | |
| Et content (mole %) | 44.2 | 49.0 | 38.2 | 28.9 | 44.1 |
| SV (mole %) | 99.5 | 99.2 | 99.4 | 99.3 | 96.0 |
| MFI (g/10 min) | 12 | 15 | 25 | 8 | 13 |
| $\eta_{60}/\eta_5$ | 0.9 | 2.6 | 2.2 | 2.0 | 0.9 |
| Plasticizer | NPG | CHD | HD | TMP | PE |
| Molecular weight | 104 | 144 | 118 | 134 | 136 |
| Melting point (°C.) | 128–130 | 45–50 | 43 | 59 | 260 |
| Formula (parts) | | | | | |
| EVOH | 40 | 35 | 45 | 50 | 55 |
| Raw starch | 60 | 65 | 55 | 50 | 45 |
| Plasticizer | 20 | 15 | 25 | 30 | 40 |
| Pelletizability | Good | Good | Good | Good | Good |
| Total light transmittance (%) | 75 | 78 | 82 | 76 | 74 |
| Modulus in tension (kgf/cm) | 6300 | 4800 | 5100 | 6600 | 9000 |
| Film formability | Good | Good | Good | Good | Good |
| Bleeding | None | None | None | None | None |
| Biodegradability | a | a | a | a | a |

(Note)
The abbreviations in the plasticizer column mean the following.
NPG: neopentyl glycol
CHD: 1,4-cyclohexanedimethanol
HD: 1,6-hexanediol
TMP: trimethylolpropane
PE: pentaerythritol

Reference Examples 1~2, Comparative Examples 6~7

The procedures of Examples 6~10 were repeated except that the compounds indicated below in Table 3 were used as the plasticizer. The results are set forth in Table 3.

TABLE 3

| | Reference Example | | Comparative Example | |
| --- | --- | --- | --- | --- |
| | 1 | 2 | 6 | 7 |
| Characteristic values of EVOH | | | | |
| Et content (mole %) | 44.2 | 49.0 | 38.2 | 28.9 |
| SV (mole %) | 99.5 | 99.2 | 99.4 | 99.3 |
| MFI (g/10 min) | 12 | 15 | 25 | 8 |
| $\eta_{60}/\eta_5$ | 0.9 | 2.6 | 0.1 | 0.3 |
| Plasticizer | Gly | L-PEG | H-PEG | SB |
| Molecular weight | 92 | 300 | 4000 | 182 |
| Melting point (°C.) | 18 | −15~6 | 53~56 | 97 |
| Formula (parts) | | | | |
| EVOH | 40 | 35 | 45 | 50 |
| Raw starch | 60 | 65 | 55 | 50 |
| Plasticizer | 20 | 15 | 25 | 30 |
| Pelletizability | Good | Good | Good | Good |
| Total light transmittance (%) | 80 | 78 | 0 | 80 |
| Modulus in tension | 5600 | 5200 | 12000 | 30000 |

TABLE 3-continued

|  | Reference Example | | Comparative Example | |
|---|---|---|---|---|
|  | 1 | 2 | 6 | 7 |
| (kgf/cm$^2$) Film formability | Good | Good | Poor | Poor |
| Bleeding | Observed | Observed | — | — |
| Biodegradability | b | b | — | — |

(Note)
The abbreviations in the plasticizer column mean the following.
Gly: glycerin
L-PEG: low molecular weight polyethylene glycol
H-PEG: high molecular weight polyethylene glycol
SB: sorbitol
(Note)
In the pelletizability column, "poor" means a difficulty in take-up of the strand.

In the film formability column, "poor" means a difficulty in the formation of film.

Therefore, the bleeding and biodegradability parameters in Comparative Examples 6 and 7 were not determined.

Examples 11~15

Production of saponified ethylene-vinyl acetate copolymers

To a methanolic solution of an ethylene-vinyl acetate copolymers varying in ethylene content was added a methanolic solution of sodium hydroxide as the catalyst and a continuous saponification reaction was conducted in a reactor. The resulting solution of the saponified copolymer in methanol was diluted with water to prepare a mixed solution in methanol and water and the dilution was discharged from a nozzle into water at a temperature not exceeding 20° C. Thereupon the solution became coagulated in a strand form with a diameter of about 3 mm. The coagulate was taken out from the water and cut.

The coagulated strand was pelletized with a pelletizer, rinsed to remove sodium acetate from the polymer, washed with a dilute aqueous solution of acetic acid and further with a dilute aqueous solution of phosphoric acid and dried under varying drying conditions to adjust to the target water content.

The characteristic values, water contents, and melting points (DSC peak temperatures) in hydrous state of the resulting hydrous saponified ethylene-vinyl acetate copolymers are shown in Table 4.

Pelletization of compound

A Henschel mixer was charged with pellets of the above hydrous ethylene-vinyl acetate copolymer and raw starch (corn starch with a water content of 12 weight in the proportions and combination indicated in Table 4. After mixing, the mixture was fed to a twin-screw extruder with vent means and melt-extruded in the form of a strand and pelletized with a pelletizer. The operating parameters of the twin-screw extruder were as follows.

| Screw diameter | 30 mm |
|---|---|
| L/D | 30 |
| Screw RPM | 150 rpm |
| Vent | open vent |
| Die | Two nozzles, 3.0 mm in diameter |

| Temperature settings | | | | | | |
|---|---|---|---|---|---|---|
| C$_1$ | C$_2$ | C$_3$ | C$_4$ | C$_5$ | H | D |
| 50° C. | 110° C. | 120° C. | 120° C. | 120° C. | 120° C. | 120° C. |

Melt-molding

The compound pellets obtained as above were fed to an injection molding machine with a cramping pressure of 100 tons and injection-molded under the following conditions to fabricate a sheet (flat) sized 100 mm×100 mm×1.5 mm (thickness), a No. 1 tensile test-piece according to JIS K-7113, and a flexure test-piece according to JIS K-2703.

| Injection pressure | 200 kg/cm$^2$ |
|---|---|
| Injection speed | High pressure setting |
| Mold | A flat sheet mold of fan gate type, side gate No. 1 Tensile testpiece mold and flexure testpiece mold |
| Mold temperature | 40° C. |

| Temperature conditions | | | |
|---|---|---|---|
| C$_1$ | C$_2$ | C$_3$ | Nozzle |
| 100° C. | 110–140° C. | 110–140° C. | 110–140° C. |

Results

The results as well as the conditions used are shown in Table 4.

TABLE 4

|  | Example | | | | |
|---|---|---|---|---|---|
|  | 11 | 12 | 13 | 14 | 15 |
| Characteristic values of EVOH | | | | | |
| Et content (mole %) | 44.0 | 44.0 | 44.0 | 38.0 | 29.0 |
| SV (mole %) | 99.5 | 99.5 | 99.5 | 99.5 | 99.5 |
| MFI (g/10 min) | 12 | 12 | 12 | 25 | 8 |
| $\eta_{60}/\eta_5$ | 0.9 | 0.9 | 0.9 | 2.2 | 2.0 |
| Water content (wt %) | 53 | 53 | 26 | 30 | 55 |
| Melting point in hydrous state (°C.) | 96 | 96 | 100 | 98 | 93 |
| Formula (parts) | | | | | |
| Hydrous EVOH | 150 | 100 | 100 | 100 | 160 |
| Raw starch | 100 | 100 | 100 | 100 | 100 |
| Pelletizability | Good | Good | Good | Good | Good |
| Pellet composition (wt %) | | | | | |
| EVOH | 33 | 26 | 40 | 38 | 34 |
| Raw starch | 42 | 50 | 47 | 48 | 41 |
| Water | 25 | 24 | 13 | 14 | 25 |
| Injection moldability of pellet | Good | Good | Good | Good | Good |
| Mechanical strengths | | | | | |
| Tentile strength (kg/cm$^2$) | 240 | 300 | 350 | 360 | 260 |
| Elongation (%) | 50 | 40 | 40 | 35 | 40 |
| Flexural strength (kg/cm$^2$) | 220 | 280 | 350 | 350 | 250 |
| Bleeding | None | None | None | None | None |
| Biodegradability (disintegratability) | | | | | |
| Six months | b | b | b | b | b |
| One year | a | a | a | a | a |

(Note)
In the pelletizability column, "good" means satisfactory blending and good takeup of the strand.

The mechanical strengths were measured at 20° C. in accordance with JIS K-7113 (tensile test) and JIS K-2703 (flexure test).

For the evaluation of biodegradability (disintegratability), the flat sheet samples obtained as above were buried in a compost-soil mixture and 6 months and one year later were taken out and visually examined and scored on the following 3-grade scale.

a: Not less than 50% by volume of the sample has lost shape.

b: The entire surface of the sample has been corrugated and the four edges are also indented, indicating that disintegration is in progress.

c: Recessed spots are locally found on the surface and edges of the sample

Film production Examples 1~4

Production of hydrous saponified ethylene-vinyl acetate copolymers

The hydrous saponified ethylene-vinyl acetate copolymers indicated in Table 5 were prepared in the same manner as Examples 11~15.

Production of films from compositions

A Henschel mixer was charged with pellets of the above hydrous ethylene-vinyl acetate copolymer, raw starch (corn starch with a water content of 12 weight and, as necessary, glycerin in the proportions and combinations shown in Table 5. The mixture was then fed to a twin-screw extruder equipped with vent means and melt-extruded into a strand at 120° C. and pelletized with a pelletizer.

The resulting pellets were fed to a single-screw extruder and extruded through a T-die at a cylinder temperature of not higher than 140° C. and a die temperature of not higher than 140° C. to prepare a 35 μm-thick film, The film was passed through a hot-current circulating drying furnace at 150° C. to adjust the water content of the film to not more than 7%, Production of films The materials mentioned in each Example were fed in the indicated proportions to a single-screw extruder and extruded from a T-die at a cylinder temperature of 200° to 230° C. and a die temperature of 200° to 230° C. to prepare a 50 μm-thick film.

Conditions and Results

Pelletizability ratings, compositions and film-forming properties are shown in Table 5.

TABLE 5

| | Film production Example | | | |
|---|---|---|---|---|
| | 1 | 2 | 3 | 4 |
| Characteristic values of EVOH | | | | |
| Et content (mole %) | 44.2 | 27.8 | 38.2 | 46.8 |
| SV (mole %) | 99.5 | 99.5 | 99.4 | 99.2 |
| MFI (g/10 min) | 12 | 8 | 25 | 14 |
| η60η5 | 0.9 | 2.0 | 2.2 | 1.0 |
| Water content (wt %) | 26 | 40 | 35 | 40 |
| Melting point in hydrous state (°C.) | 100 | 95 | 97 | 93 |
| Formula (parts) | | | | |
| Hydrous EVOH | 67.6 | 108.3 | 84.6 | 58.3 |
| Raw starch | 56.8 | 39.8 | 51.1 | 73.9 |
| Glycerin | — | — | — | 19 |
| Pelletizability | Good | Good | Good | Good |
| Pellet composition (wt %) | | | | |
| EVOH | 42.1 | 46.6 | 42.2 | 25.6 |
| Raw starch | 42.1 | 25.1 | 34.6 | 47.4 |
| Water | 15.8 | 28.3 | 23.2 | 20.2 |
| Glycerin | — | — | — | 6.8 |
| Dry weight ratio of raw starch to EVOH | 50/50 | 35/65 | 55/45 | 65/35 |
| Film-forming property | Good | Good | Good | Good |
| Film code number | F-1 | F-2 | F-3 | F-4 |

Fabrication of laminates

Examples 16~19

Using an isocyanate anchor coating agent (D), the above film (F-1), (F-2), (F-3) or (F-4) was dry-laminated with the following substrate film (C-1), (C-2), (C-3) or (C-4) to fabricate a laminate with the layer thicknesses (μm) of (F)/(D)/(C)=35/1/50.

(C-1): an ethylene-CO copolymer film
(C-2): a low-density polyethylene film blended with 10 weight % of an ethylene-methyl vinyl ketone (5 mole %) copolymer
(C-3): a high-density polyethylene film blended with 10 weight % of a thermoplastic 1,2-polybutadiene
(C-4): a linear low-density polyethylene film containing 0.5 weight % of ferric stearate The laminar structures and measured data are shown in Table 6.

TABLE 6

| | Example | | | |
|---|---|---|---|---|
| | 16 | 17 | 18 | 19 |
| Laminar structure | | | | |
| Film (F) | F-1 | F-2 | F-3 | F-4 |
| Base film (C) | C-1 | C-2 | C-3 | C-4 |
| Oxygen permeability (cc/m² · 24 hr · atm) | | | | |
| 25° C., 30% RH | 0.5 | 0.3 | 0.4 | 1.5 |
| 25° C., 75% RH | 1.5 | 1.0 | 1.7 | 7.3 |
| Interlayer bond strength (g/25 mm wide) | 850 | 830 | 760 | 530 |
| Natural disintegratability on soil | Yes | Yes | Yes | Yes |

(Note)
Oxygen permeability was measured in accordance with ASTM D 3985 at 25° C., 30% RH and 75% RH using Modern Control's OX-TRAN 100.

The interlayer bond strength was measured between film layer (F) and base film layer (C) in accordance with JIS Z-0237.

As to disintegratability, a film sample 1 m×1 m was set with its film layer (F) in contact with the ground surface and the film was visually inspected after 6 months and one year. As a result, the films according to Examples 16~19 showed formation of many cracks after 6 months and had disintegrated completely out of shape by the end of one year.

Example 20

The above film (F-1) was laminated with a 30 μm-thick kraft paper by hot-pressing and the physical properties of the laminate were determined. The oxygen permeability was 0.5 cc/m²·24 hr.atm at 25° C., 30% RH and 1.6 cc/m²·24 hr-atm at 25° C., 75% RH. The interlayer bond strength could not be measured because of breakage of the kraft paper during determination. As to disintegratability, many cracks and holes were found after 6 months and no shape was retained after 1 year.

Comparative Example 8

On a 50 μm-thick polyethylene film surfaced with an anchor coating material was formed a 35 μm-thick starch layer by the casting method using raw starch (corn starch with a water content of 12 weight %). The oxygen permeability of this laminate film was 2.0 cc/m²·24 hr.atm at 25° C., 30% RH and 70 cc/m²·24 hr-atm at 25° C., 75% RH. As to interlayer bond strength, peeling occurred and the starch film was easily broken at 0 g/25 mm width.

Comparative Example 9

A Henschel mixer was charged with 80 parts by weight of a low-density polyethylene with a melt index of 6 g/10 min. (Mitsubishi Kasei Corporation, F-161) and 20 parts by weight of raw starch (corn starch with a water content of 12 weight %) and after blending, the mixture was fed to an extruder for pelletization. The pellets were fed to an extruder and melt-extruded through a T-die at a cylinder temperature of 190° C. and a die temperature of 180° C. to provide a 30 μm-thick film. When the proportion of raw starch was increased over the above value, no film could be produced.

Using an isocyanate anchor coating agent (D), the film obtained above was dry-laminated with a 30 μm-thick polyethylene film and the physical properties of the laminate were determined.

The oxygen permeability of this laminate film was not less than 1000 cm/m$^2$·24 hr atm at 25° C., 30% RH and not less than 1000 cm/m$^2$·24 hr-atm at 25° C., 75% RH. The interlayer bond strength was 850 g/25 mm width.

Examples 21~27

Production of saponified ethylene-vinyl acetate copolymers

An ethylene-vinyl acetate copolymer was saponified and washed in the same manner as Examples 11–15 and dried to give the saponified ethylene-vinyl acetate copolymers indicated below in Table 7.

TABLE 7

| | E-1 | E-2 | E-3 |
|---|---|---|---|
| Characteristic values of EVOH | | | |
| Et content (mole %) | 29.2 | 38.8 | 43.3 |
| SV (mole %) | 99.5 | 99.4 | 99.5 |
| Melting point (°C.) | 186 | 178 | 167 |
| MFI (g/10 min) | 8.2 | 25.4 | 12.1 |
| $\eta_{60}/\eta_5$ | 1.9 | 2.2 | 0.9 |

Compound pelletization

Starch and glycerin were admixed and the mixture was fed in a predetermined amount through a measuring feeder to a twin-screw extruder, in which it was melted by heating at 170° C. Then, a saponified ethylene-vinyl acetate copolymer prepared as shown in Table 7 was fed in a predetermined amount through a measuring feeder to a single-screw extruder and melted by heating at 210° C. The melt was fed to the above twin-screw extruder via its side feeding port. The two charges were blended until a homogeneous blend was obtained. The formulas are shown hereinafter in Table 8. The extruder parameters were as follows.

| Twin-screw extruder | |
|---|---|
| Screw diameter | 30 mm |
| L/D | 30 |
| Screw RPM | 120 rpm |
| Extrusion temperatures | $C_1$ 70° C. |
| | $C_2$ 160° C. |
| | $C_3$ 170° C. |
| | $C_4$ 170° C. |
| | $C_5$ 170° C. |
| | Adapter 170° C. |
| | Die 170° C. |
| | (Side feeder: $C_3$) |
| Single-screw extruder | |
| Screw diameter | 30 mm |
| L/D | 24 |
| Screw RPM | 100 rpm |
| Extrusion temperatures | $C_1$ 210° C. |
| | $C_2$ 200° C. |
| | $C_3$ 210° C. |
| | Joint 210° C. |

Production of films

The compound pellets obtained by 12-hr continuous extrusion as externally supplemented with an aggregate (0.3 part of ethylenebisstearoidamide) was fed to a single-screw extruder equipped with a T-die to prepare a 50 μm-thick film. The film-forming conditions at the single-screw extruder were as follows.

| Screw inside diameter | 40 mm |
|---|---|
| L/D | 28 |
| T-die | Coat hanger type |
| Die width | 450 mm |
| Die lip opening | 0.5 mm |
| Extrusion temperature | 140–180° C. |

TABLE 8

| | Example | | | | | | |
|---|---|---|---|---|---|---|---|
| | 21 | 22 | 23 | 24 | 25 | 26 | 27 |
| Formula | | | | | | | |
| Twin-screw extruder | | | | | | | |
| Starch (water content 12.8%) | 70 | 120 | 120 | 200 | 120 | 200 | 300 |
| Glycerin | 10 | 20 | 10 | 10 | 10 | 10 | 20 |
| Single-screw extruder | | | | | | | |
| EVOH | E-1 | E-1 | E-2 | E-2 | E-3 | E-3 | E-3 |
| | 100 | 100 | 100 | 100 | 100 | 100 | 100 |
| Evaluation | | | | | | | |
| Processability | | | | | | | |
| Surface of strand | Smooth | Smooth | Smooth | Smooth | Smooth | Smooth | Smooth |
| Thermal coloration of pellet | Light yellow | Light yellow | Light yellow | Light yellow | Light yellow | Light yellow | Light yellow |
| Quality | | | | | | | |
| Degree of granular structure | Good | Good | Good | Good | Good | Good | Good |
| Tensile strength (kg/cm$^2$) | 420 | 350 | 380 | 370 | 370 | 350 | 250 |

TABLE 8-continued

| | Example | | | | | | |
|---|---|---|---|---|---|---|---|
| | 21 | 22 | 23 | 24 | 25 | 26 | 27 |
| Elongation (%) | 300 | 280 | 270 | 200 | 250 | 210 | 150 |

(Note)
Processability was evaluated in terms of the surface condition of the strand obtained after 15 hours of continuous extrusion and the thermal coloration of the pellets. The surface condition of the strand follows a course toward roughening and the thermal coloration of pellets progresses in the order of light yellow (normal) to yellow to brown.

Quality was assessed in terms of the degree of entry of grains (degraded resin gels, burnt resin grains, charred resin grains, and unfused gels) sized 1 mm or larger per 30 cm×30 cm of the film prepared from the pellets obtained after 15 hours of operation ($\leq 5$ good, 6–20, some, >20 abundant) and the tensile strength and elongation (as measured at a pulling speed of 500 mm/min, a chuck-to-chuck distance of 50 mm and a reference line-to-line distance of 20 mm) of the film.

INDUSTRIAL APPLICABILITY

Shaped products obtainable from the biodegradable composition of the invention find application in a variety of fields such as packaging materials (film, sheet, bottle, cup, tray, can carrier, agricultural materials (agricultural film, bundling tape, etc.) and civil materials (diaper backing sheet, shopping bag, garbage bag, etc.).

It is claimed:

1. A biodegradable resin composition comprising a saponified ethylene-vinyl acetate copolymer having an ethylenevinyl acetate copolymer having an ethylene content of 20 to 60 mole a vinyl acetate saponification degree of not less than 90 mole a melt flow index of 1 to 100 g/10 min as measured under a load of 2160 g at 210° C., and a melt viscosity ratio of $\eta\eta_{60}/\eta_5$ of 0.8 to 2.5 where $\eta_{60}$ means the melt viscosity after 60 minutes of standing at 250° C. and the $\eta_5$ means the melt viscosity after 5 minutes of standing at 250° C. and a starch-based macromolecular substance, wherein said saponified ethylene-vinyl acetate copolymer and said starch-based macromolecular substance occur in a ratio of 80:20 through 20:80 and wherein one of said saponified ethylene-vinyl acetate copolymer and said starch-based macromolecular substance is fed to an extruder via its main feeder and melted in the extruder and the other is fed in a molten state to the extruder via a side feeder, and said saponified ethylene-vinyl acetate copolymer and said starch-based macromolecular substance are blended together in a molten state in the extruder.

2. The biodegradable resin composition of claim 1 wherein the saponified ethylene-vinyl acetate copolymer is a hydrous saponified ethylene-vinyl acetate copolymer having a water content of 20 to 60 weight %.

3. The biodegradable resin composition of claim 1 which contains a plasticizer in addition to said saponified ethylene-vinyl acetate copolymer and starch-based macromolecular substance.

4. The biodegradable resin composition of claim 1 wherein the plasticizer is a polyhydric alcohol containing 2 to 4 hydroxyl groups and having a melting point of not lower than 40° C. and a molecular weight of not more than 600.

5. A laminate comprising a layer composed of a biodegradable resin composition comprising a saponified ethylenevinyl acetate copolymer having an ethylene content of 20 to 60 mole % a vinyl acetate saponification degree of not less than 90 mole %, a melt flow index of 1 to 100 g/10 min as measured under a load of 2160 g at 210° C., and a melt viscosity ratio $\eta_{60}/\eta_5$ of 0.8 to 2.50 where $\eta_{60}$ means the melt viscosity after 60 minutes of standing at 250° C. and $\eta_5$ means the melt viscosity after 5 minutes of standing at 250° C. and a starch-based macromolecular substance, wherein said saponified ethylene-vinyl acetate copolymer and said starch-based macromolecular substance occur in a ratio of 80:20 through 20:80 and wherein one of said saponified ethylene-vinyl acetate copolymer and said starch-based macromolecular substance is fed to an extruder via its main feeder and melted in the extruder and the other is fed in a molten state to the extruder via a side feeder, and said saponified ethylene-vinyl acetate copolymer and said starch-based macromolecular substance are blended together in a molten state in the extruder and a layer of substrate material selected from the group consisting of a thermoplastic resin, paper, woven cloth, nonwoven cloth, metal, foil and wood board.

6. The laminate of claim wherein said substrate material is a layer of at least one photodegradable polymer selected from the group consisting of ethylene-CO copolymer, ethylene-vinyl ketone copolymer, polybutadiene and isoprene rubber or a polyolefinic photodegradable polymer containing at least one of said polymers as blended.

* * * * *